United States Patent Office 3,344,085
Patented Sept. 26, 1967

3,344,085
PROCESS FOR THE PREPARATION OF SINTERED METALLIC OXIDE CATALYST PELLETS
Albert J. Isacks, Odessa, Tex., and Robert R. Lugg, Pensacola, Fla., assignors to Monsanto Company, St. Louis, Mo., a corporation of Delaware
No Drawing. Filed May 23, 1966, Ser. No. 551,958
7 Claims. (Cl. 252—447)

The application is a continuation-in-part of now abandoned application Ser. No. 305,526, filed August 29, 1963, in the names of the same inventors as the instant application.

This invention relates to an improved process for the preparation of catalyst and more particularly to an improvement in the process for the preparation of pelleted metal oxide catalysts.

The ever increasing commercial need for synthetic chemicals makes necessary a continuing and expanding demand for improved processes for preparing high purity inorganic and organic materials; and this need for high volume, high yield commercial processes provides a continuing need for synthesizing chemicals by catalytic promoted reaction. One important organic material for which such a need exists is the chemical intermediate, hexamethylenediamine, which may be used, among other applications, in the commercial manufacture of synthetic polymers such as polyamides, polyester amides, and like materials. Commercial manufacture of hexamethylenediamine may be accomplished generally by the hydrogenation of adiponitrile in the presence of a pelleted metal oxide catalyst, and large scale production of the hexamethylenediamine necessitates large scale commercial production of the pelleted metallic oxide catalyst.

Commercial preparation of a suitable pelleted metallic oxide catalyst for hydrogenations, including the hydrogenation of adiponitrile to hexamethylenediamine, is well known in the art and comprises the steps of dissolving the chosen catalyst metal in nitric acid to form a metallic nitrate solution; precipitating the metal from the nitrate solution in the form of basic metallic carbonate; filtering and washing the precipitated basic metallic carbonate with water to remove any soluble salts; heating or calcining the filtered and washed basic metallic carbonate precipitate to a temperature of about 400° C. to form a mixture of metallic oxides; kneading the mixture of metallic oxides with water to give a dense paste; drying the paste; pulverizing or granulating the dry paste to form a powder of which 100 percent passes through a 10 mesh U.S. standard screen; adding and thoroughly mixing from 1 percent to 5 percent by weight of an animal or vegetable stearin or normally high molecular weight fatty acid as a lubricating sintering aid to the prepared powder; pelleting the mixture of powder and lubricating sintering aid by suitable means to form pellets of a desired size and configuration; and sintering the resulting pellets in the presence of an oxygen-containing atmosphere at a temperature between 500° C. and 1100° C. for a period of two to four hours.

Accordingly, the process of preparing catalyst according to the methods of the prior art has been time consuming by virtue of the multifold steps involved in the densification operation with water, the necessary subsequent drying and the separate admixing of lubricating sintering aid.

The animal or vegetable stearins and normally high molecular weight fatty acids used as lubricating sintering aids generally melt quite readily at temperatures of 50° C. to 80° C., and when the lubricating sintering aid is added to warm metallic oxide powder, the sintering aid melts and will not mix thoroughly with the powder. Catalyst pellets produced from non-uniformly mixed material will have low crushing strength after sintering if too little sintering aid is present, and pellets that are extremely hard but have low catalyst activity may result if too much sintering aid is present.

Further, when preparing sintered metallic oxide catalyst pellets, a safety hazard may be present during the mixing of the metallic oxide powder and the lubricating sintering aid. Since the mixture contains both a fuel and oxygen, fires which cannot be extinguished readily and can be extremely hazardous may result during the mixing.

Also, since the mixture of lubricating sintering aid and metallic oxide powder is somewhat tacky and greasy, attempts to use vacuum operated dust collectors during the pelleting of the catalyst, prior to sintering, to reduce catalyst losses and make working conditions more pleasant have been frustrated.

Although these problems presented by the use of such organic lubricating sintering aids exist, their use has persisted in preference to other lubricants such as graphite because with graphite it has not heretofore been possible to obtain catalyst pellets of sufficient strength to be satisfactory, as reported in U.S. Patent 2,570,882. High pellet crushing strength tends to preserve the pellets in integral form and minimizes the effects of "dusting" which results in proceses inefficiency.

An object of the present invention is to provide a process for the preparation of pelleted metallic oxide catalyst with good uniformity and catalyst activity.

Another object of the present invention is to provide a process for the preparation of pelleted metallic oxide catalyst which has increased safety and requires fewer handling processing steps.

A further object of the invention is to provide an improved process for the preparation of pelleted metallic oxide catalyst which reduces markedly the loss of costly raw materials.

These and other objects of this invention will be apparent from the description hereinafter.

In accordance with this invention, it has been discovered that sintered oxide catalyst pellets of superior catalytic activity and having crushing strengths comparable to those attainable with organic lubricating sintering aids can be prepared with less process effort and steps by carrying out a substantially dry densification operation wherein the catalyst metal oxide having an average particle size of less than 100 microns is admixed with from 1 to 5 percent by weight of graphite, 90 percent of which passes through a 325 mesh screen. Thus, the novel process of the instant invention comprises obtaining the metal oxide or mixture of oxides by methods known in the art, for example by precipitating the basic metallic carbonate from a metal nitrate solution with carbon dioxide and ammonia, and heating or calcining the carbonate at from 300° C. to 500° C. to obtain the metal oxide, pulverizing the said metal oxide if necessary to obtain an average particle size of less than 100 microns, combining intimately in a substantially dry densification operation the said oxide with 1 to 5 percent by weight based on the oxide of graphite of such particle size that at least about 90 percent will pass through a 325 mesh screen, pelleting the so-densified mixture by suitable means, and sintering the resulting pellets in an oxidizing atmosphere at a temperature between 500° C. and 1100° C. for a period sufficient to bring substantially all the catalyst parts to a temperature to produce the desired strength and density. The catalyst so produced is found to be more easily produced, is of comparable strength to pellets using organic lubricating sintering aids, and further demonstrates increased activity over identical catalyst with organic lubricating sintering aids.

The metal which may be used to prepare metallic catalyst pellets by the process of this invention to promote or activate hydrogenation reactions, including the hydrogenation of adiponitrile, may include those hydrogenating metals of Groups VIII I–B and II–B in the periodic table either alone, in admixture, or combined with a difficulty reducible oxide of a metal of Group VI. Cobalt and nickel are those metals having greatest commercial favor to prepare catalysts for the hydrogenation of adiponitrile to hexamethylenediamine.

In a preferred example for the preparation of sintered metallic oxide pellets for the catalytic hydrogenation of adiponitrile to hexamethylenediamine, cobalt in a purity of at least 97.0 percent is preferred as the metal to be used in the process of this invention.

Any suitable acid may be used to dissolve the catalyst metal or the combination of the catalyst metals, provided the acid will form a soluble salt with the catalyst metal or metals and will not introduce elements or combinations of elements which have a deadening effect upon the hydrogenation ability of the prepared catalyst. It is well known in the art that sulphur and chlorine, either alone or in combination with other elements, as well as oxides of sodium, potassium, manganese, and others, will have a deadening effect on the hydrogenation activity of metallic oxide catalysts. Therefore, those acids which may introduce these elements alone or in combination with other elements are not preferred for use to form the soluble metallic salt solution with the catalyst metal or metals. In a preferred example for the preparation of sintered cobalt oxide catalyst pellets as a catalyst for the hydrogenation of adiponitrile to hexamethylenediamine, an aqueous solution of nitric acid may be used for forming a soluble cobalt nitrate solution. The concentration of the nitric acid in the aqueous solution should be sufficient to dissolve the cobalt metal completely, and the quantity of the aqueous solution of nitric acid needed to dissolve the cobalt metal completely is dependent upon the concentration of the aqueous nitric acid solution used.

The precipitation of the catalyst metal from the soluble salt solution in the form of a basic metallic carbonate may be effected by the addition of ammonium carbonate, ammonium bicarbonate, carbon dioxide and ammonia, or other metallic carbonate formers to the solution. The soluble metallic salt solution may or may not be diluted with demineralized water prior to the precipitation, and should it be desired to add catalyst promoters such as barium and silica, these or any other promoters may be added to the soluble metallic salt solution prior to the precipitation of the basic metallic carbonate. In a preferred example, the precipitation of the basic cobalt carbonate from an aqueous cobalt nitrate solution may be effected by the addition of ammonia to the solution in the presence of an excess of carbon dioxide. Care should be exercised during the precipitation of the basic cobalt carbonate to prevent a high concentration of free ammonia which may result from a loss of carbon dioxide which dissolves more slowly than ammonia in the aqueous solution. Should this occur, digestion of the slurry or precipitate with additional carbon dioxide may be necessary to reduce cobalt amines which may be formed and will cause an attending yield loss. The precipitation should be carried out so as to obtain a carbonate product of fine particle size.

The filtering and washing of the precipitated basic metallic carbonate with water may be effected by any suitable vacuum or pressure filtering or washing device well known in the art. In a preferred example, the precipitated slurry containing the basic cobalt carbonate may be filtered through a vacuum plate and frame filter press, and washing of the filter cake in the press should be thorough to avoid the retention of by-product ammonium nitrate which may decompose in subsequent steps of the process to form toxic and objectionable oxides of nitrogen. Excess water, if any, may be removed from the washed filter cake by any suitable means such as air blowing, if desired.

Heating or calcining of the filtered and washed basic metallic carbonate may be accomplished in one or more steps. Moisture may be removed from the washed basic metallic carbonate, and the dried basic metallic carbonate then may be heated for conversion to the mixture of metallic oxides. If desired, these steps may be combined depending upon the design and capacity of ovens and igniters or other suitable heating apparatus. In a preferred example, the basic cobalt carbonate filter cake may be placed in an igniter of a design well known in the art or other heating device designed to heat material to a temperature between 300° C. and 500° C. in an oxygen-containing atmosphere. If desired, the basic cobalt carbonate filter cake may be dried in a suitable drying oven of standard design for periods up to eight hours prior to its being placed in the igniter. In a preferred example, an igniter may comprise a heavily insulated chamber equipped with suitable ducts to distribute preheated air evenly to all parts of an insulated chamber and suitable means for heating air and the inside of the insulated chamber to a temperature of at least 600° C.

The precipitated catalyst metal carbonate is normally quite fine, and the resulting oxide will have such a fine texture with average particle size being less than 100 microns. If necessary, the catalyst metal oxides should be pulverized to achieve an average particle size less than 100 microns.

The mixture of metallic oxides resulting from the heating or calcining step may be combined without addition of water with graphite to obtain a densified and substantially homogeneous mixture of the compounds. In such a dry densification, the graphite provides an unsuspected lubricating and sintering aid to the mixture of metallic oxides, which lubricating and sintering aid is necessary for successful subsequent pelleting and sintering operations. The graphite used may be any of the fine graphites, 90 percent of which passes through a 325 mesh screen and has a graphitic carbon content of about 82 percent or greater. Although suitable graphite for the practice of this invention may be obtained commercially under various names and numbers, flake graphite which has been found to meet substantially U.S. Federal specification SS–G–659 may be suitable for the practice of this invention. In a preferred example for the preparation of sintered cobalt oxide catalyst pellets, Micro-Fyne graphite, 95 percent of which passes through a 325 mesh screen (trademark for lubricating graphite from Joseph Dixon Company), or its equivalent may be used in accordance with the process of this invention.

Graphite in an amount of 1 percent to 5 percent by weight of the mixture of metallic oxides, and preferably from 2 percent to 4 percent by weight of the mixture of metallic oxides, may be combined intimately to obtain a properly densified and a substantially homogeneous mixture by the use of any suitable mixing device, such as a roller mill of the pan type or a ribbon mixer, both well known in the art. The densification is very satisfactorily accomplished under dry conditions by mulling in a pan type roller mill. When a pan type roller mill is used, a wheel or wheels, rolling in a circular path, operate through the mass of the mixture of metallic oxides and graphite against a fixed or a rotating pan to compress, mix, and fold the mixture on itself. To produce this motion, the pan may rotate or be fixed while the wheel or wheels are fixed or rotating in the same or opposite directions to the pan to vary the velocity at which the pan and wheel or wheels rotate relative to each other. The distance, or clearance, between the pan bottom and the rotating wheel or wheels may be varied and the vertical loading, at any given clearance, applied to the mixture between the pan and the wheel or wheels rolling in a circular path may be varied also.

When a pan type roller mill is used in accordance with this invention to densify and combine intimately a mixture of metallic oxides and graphite, it has been found that the clearance between the pan and rolling wheel or wheels may be between 0 and 0.50 inch and the vertical loading applied to the mixture by the rolling wheel may be between 0 and 500 pounds or greater. The rate at which the wheel or wheels roll in the circular path relative to the pan may be varied, with the period required for proper mixing being inversely proportional to the rate at which the wheel or wheels rotate relative to the pan.

In a preferred example for the intimate combination of a mixture of cobalt oxides and graphite in a pan type roller mill in accordance with the process of this invention, substantially homogeneous mixing and proper densification of the mixture for example to produce a substantially homogeneous mass having a bulk density of 1.00 to 1.50 grams per cubic centimeter, may be obtained with a clearance between a rolling wheel or wheels and the pan of between 0 and 1/8 inch, a vertical loading on the wheel or wheels between 0 and 100 pounds or greater, and the wheel or wheels rolling in a circular path at a rate between 5 and 100 revolutions per minute relative to the pan.

The mixing time required for substantially homogeneous combination and suitable densification of the mixture of metallic oxides and graphite may vary depending upon the clearance between the pan of a mixing apparatus and the rotating wheel or wheels, the vertical load being applied to the wheels, and the rate at which the wheels are rolling in a circular path in the pan of a pan type roller mill. In general, for efficient, economical mixing, it may be preferred to operate the pan type roller mill mixing device at minimum clearances and maximum wheel loadings and rotational rates, within the design and construction of the mixing apparatus, to maintain mixing times at a minimum and to obtain substantially homogeneous, densified mixtures of the metallic oxides and the graphite.

In a preferred example, the mixing time for substantially homogeneous combination and suitable densification in accordance with the process of this invention may be from fifteen minutes to five hours in a pan type roller mill for mixing a mixture of cobalt oxides with from 1 percent of 5 percent by weight of graphite when a batch of 5 to 500 pounds of the mixture is charged to a pan type roller mill with two wheels set at a clearance between 0 and 1/8 inch, a vertical loading on each wheel between 0 and 500 pounds or greater, and the wheels rolling in a circular path at a rate relative to the pan of between 5 and 100 revolutions per minute.

Proper substantially homogeneous densification of the mixture of metallic oxides and graphite prior to the pelleting and the subsequent sintering thereof, is one of the more critical steps in a process for the preparation of sintered catalyst pellets. It is well known in the art that when low density mixtures of metallic oxides are pelleted and sintered, catalyst pellets with low densities and a high degree of frangibility result. When an attempt is made to use catalyst pellets with a high degree of frangibility in hydrogenations or other catalytic processes, the catalyst pellets may become crushed or broken causing a major portion of the pellets to become catalyst powder which will not permit gaseous or liquid reacting materials to pass therethrough readily which result necessitates the stopping of the catalytic process.

It has now been found from this process for the preparation of sintered metallic oxide catalyst pellets that when the sintered catalyst pellets have a density of 1.75 to 3.25 grams per cubic centimeter, sintered metallic oxide catalyst pellets that retain their integrity in process applications are obtained. Further, it has now been found from this process that mixtures of metallic oxides from the process step of heating or calcining a basic metallic carbonate at a temperature between 300° C. and 500° C. may have a density of 0.50 to 0.75 gram per cubic centimeter. If sintered catalyst pellets with a density of 1.75 to 3.25 grams per cubic centimeter and good hydrogenation activity are to obe obtained, this mixture of metallic oxides must be densified and substantially homogeneously mixed with a suitable graphite.

Following the combining of the mixture of metallic oxides and the graphite, the densified, substantially homogeneous resulting mixture may be pelleted by any suitable pelleting means to form pellets of a desired shape and configuration. The pellets thus formed may then be sintered in any suitable muffle furnace well known in the art which may provide a temperaturre to the pellets of between 500° C. and 1300° C. for periods of from one to ten hours.

In a preferred example, a suitably combined mixture of cobalt oxides and from 2 percent to 4 percent by weight of graphite may be pelleted by means of a rotary pelleting machine to form substantially cylindrical pellets having a diameter between 0.10 and 0.50 inch and a height between 0.10 and 0.50 inch, and these pellets may be sintered at a temperature between 700° C. and 1100° C. in a muffle furnace comprising a hollow cylindrical insulated vessel having a heating means capable of supplying the required heat for proper sintering. Proper sintering of the cobalt oxide catalyst pellets above described may take from three to six hours at the above described conditions.

It should be understood that the means disclosed for carrying out the various steps of the process of this invention are illustrative only, and that any suitable means well known in the art for any of the steps of the process to obtain metallic oxides and to combine these oxides with graphite to form sintered catalyst pellets having the defined density are within the scope of the invention.

The following examples of preferred embodiments of the process of this invention are intended also to be illustrative only and should not be construed to limit the scope of the disclosed process.

EXAMPLE I

Samples of a mixture of cobalt oxides having an average particle size of less than 40 microns obtained from calcining basic cobalt carbonate, prepared in accordance with the preceding description, were added to a pan type roller mill (Model LF Simpson "Mix-muller" manufactured by National Engineering Company) for densification and mixing with 2 percent, 3 percent, and 4 percent by weight of graphite respectively, 95 percent of which passed through a 325 mesh screen. The clearance between the pan and the wheels rolling in a circular path was 1/8 inch, and the effective vertical loading on each of two wheels in the roller mill was 68 pounds. The wheels were rotated relative to the pan at a rate of 44 revolutions per minute. Following densification and mixing, the combined cobalt oxides and graphite mixture was pelleted in a single tablet pelleting press at a pressure of approximately 1630 p.s.i.g. The pellets thus prepared were sintered in an oxygen-containing atmosphere for five hours at approximately 950° C. After cooling, the respective crushing strengths of the sintered cobalt oxide catalyst pellets prepared with 2 percent, 3 percent, and 4 percent by weight were measured. The results are shown in Table I below.

TABLE 1.—AVERAGE CRUSHING STRENGTH SINTERED COBALT CATALYST PELLETS

|  | Sample 1 | Sample 2 | Sample 3 |
| --- | --- | --- | --- |
| Percent Graphite | 2.0 | 3.0 | 4.0 |
| Initial Pellet Diameter | .254 | .254 | .254 |
| Diameter After Sintering at 950° C. for 5 hours | .228 | .226 | .229 |
| Crushing Strength of Sintered Pellets (Kg.) | 6.1 | 5.2 | 5.6 |

By comparison with an average crushing strength of 6.2, 7.0, and 6.0 kilograms for sintered cobalt oxide catalyst pellets prepared in an identical manner but using 2.0, 3.0 and 4.0 percent Sterotex respectively (Sterotex is the trade name of a product of Capitol City Products Company and is specified as a vegetable stearin 100 percent of which passes through a U.S. standard 10 mesh screen as a lubricating sintering aid) it can be seen clearly that eminently comparable crushing strengths are obtained by the use of graphite as the lubricating sintering aid in accordance with the process of this invention.

EXAMPLE II

Two 150 pound samples of a mixture of cobalt oxides having an average particle size of less than 40 microns were taken from a first batch of a mixture of cobalt oxides resulting from calcining basic cobalt carbonate in accordance with the preceding description. One 150 pound sample, Sample 1, was mixed with 3 percent by weight of Micro-Fyne graphite (trade name for lubricating graphite from Joseph Dixon Company), 95 percent of which passes through a 325 mesh screen, in a pan type roller mill (Simpson "Mix-muller" manufactured by National Engineering Company) for one hour. The resulting densified and substantially homogeneous mixture of cobalt oxides and graphite was then pelleted using a tableting machine (Stokes Manufacturing Company, type BB-2), and the pellets thus prepared were placed in a sintering basket and sintered in an electric furnace to a temperature of 850° C. Sintering was permitted to proceed until the depth of the pellets in the sintering basket had shrunk nine inches. The sintered pellets were permitted to cool in air.

The second 150 pound sample, Sample 2, was mixed in an identical manner to Sample 1 with 3 percent by weight of Sterotex (trade name of a vegetable stearin from Capitol City Products Company specified as one 100 percent of which passes through a U.S. standard 10 mesh screen) and pelleted, in a manner identical to Sample 1, into pellets the same size and shape as those of Sample 1. The Sample 2 pellets were then sintered and permitted to cool in a manner identical to the Sample 1 pellets.

Two additional samples, Sample 3 and Sample 4, of sintered cobalt oxide pellets were prepared, in a manner identical to the Sample 1 pellets, from a second batch of a mixture of cobalt oxides prepared in a manner identical to that of the first batch from which Samples 1 and 2 were prepared.

The average bulk densities and the sintering time for the four samples of catalyst pellets thus prepared are shown in Table 2 below.

TABLE 2

| Sample | Sintering Aid | Bulk Densities (grams per milliliter) | | | | Sintering Time in Hours |
|---|---|---|---|---|---|---|
| | | Calcined Cobalt Oxides | Mixed Oxides and Sintering Aid | Unsintered Pellets | Sintered Pellets | |
| 1 | 3% Graphite | .89 | 1.30 | 1.54 | 2.10 | 5.0 |
| 2 | 3% Sterotex | .89 | 1.30 | 1.54 | 2.10 | 3.5 |
| 3 | 3% Graphite | .79 | 1.30 | 1.40 | 2.30 | 2.5 |
| 4 | do | .79 | 1.30 | 1.40 | 2.35 | 2.7 |

Hydrogenation activities were determined for each of the four samples of sintered cobalt oxide pellets as prepared above by charging 40 grams of the catalyst pellets to a standard laboratory shaker bomb having 1400 cc. volume and then adding 216 grams of adiponitrile and 150 grams of anhydrous ammonia to the bomb. The temperature in the bomb was raised to 150° C., and the mixture of catalyst, adiponitrile, and ammonia was pressured to 4500 pounds per square inch gauge with hydrogen gas while the temperature of the system was maintained at 150° C. The rate at which the hydrogen pressure within the bomb decreased was recorded as a measure of the activity of the catalyst contained in the apparatus. Additional identical runs were made with catalyst pellets from each of the four samples for verification. The results of these runs are shown in Table 3 below.

TABLE 3

| Run | Catalyst Pellet Sample | Pressure Loss/Minute (P.s.i.g.) |
|---|---|---|
| 1 | 1 | 45.33 |
| 2 | 1 | 45.00 |
| 3 | 1 | 43.33 |
| 4 | 2 | 40.67 |
| 5 | 2 | 39.67 |
| 6 | 3 | 44.83 |
| 7 | 3 | 42.67 |
| 8 | 3 | 45.67 |
| 9 | 4 | 44.33 |
| 10 | 4 | 47.83 |

The hydrogenation activity for the catalyst pellets prepared using graphite as a sintering aid averaged approximately 11 percent greater than the hydrogenation activity of the catalyst pellets prepared using a vegetable stearin as the sintering aid. This increased hydrogenation activity was obtained in all cases with no attending decrease in crushing strength for the pellets which in general carries with it a noticeable increase in service life of the catalyst.

As can be seen from the above examples, the advantages of the invention over prior practice are myriad. Catalyst pellets having increased hydrogenation activity and good crushing strength are obtained with the attending and important advantages of reductions in catalyst losses during pellet preparation and noticeably reduced fire hazards. Hot mixtures of metallic oxides can be mixed with graphite safely, and the mixing of dry graphite and dry metallic oxides results in faster and more uniform mixtures than were heretofore possible when previously used sintering aids, which become liquids upon mixing, were used. Improved process, personnel working conditions, and improved reductions in losses of catalyst powders are readily available because dry mixtures are readily recoverable through the use of vacuum recovery systems well known in the art.

As many apparently widely different embodiments of this invention may be made without departing from the spirit and scope thereof, it is to be understood that the invention is not limited to the specific embodiments thereof except as defined in the appended claims.

What is claimed is:

1. In a process for the preparation of sintered metal oxide catalyst pellets wherein said metal is selected from the group consisting of the hydrogenating metals of Groups VIII, I-B and II-B in the periodic table, combinations of more than one of said metals, and admixtures of at least one of said metals with a difficultly reducible oxide of a metal of Group VI, in combination the steps comprising:

(a) combining intimately in a substantially dry densification procedure, said metal oxide or oxides having an average particle size of less than 100 microns with from 1 to 5 percent by weight, based upon the weight of the oxide, or oxides of graphite of such particle size that at least about 90 percent of said graphite passes through a 325 mesh screen;
(b) pelleting the intimately combined metal oxide or oxides and graphite; and
(c) sintering the resulting pellets at a temperature between 500° C. and 1100° C.

2. The process of claim 1 wherein said metal is cobalt.

3. The process of claim 1 wherein said metal is nickel.

4. In a process for the preparation of sintered cobalt oxide catalyst pellets having a bulk density of 1.75 to 3.25 grams per cubic centimeter, in combination the steps which comprises:
(a) combining intimately in a substantially dry densification a cobalt oxide having an average particle size of less than 100 microns with from 1 percent to 5 percent by weight, based upon the weight of the oxide, or graphite of such particle size that at least about 90 percent of said graphite passes through a 325 mesh screen;
(b) pelleting the intimately combined cobalt oxide and graphite; and
(c) sintering the resulting pellets at a temperature between 500° C. and 1100° C. for a period sufficient to produce catalyst pellets having a density of 1.75 to 3.25 grams per cubic centimeter.

5. In a process for the preparation of sintered cobalt oxide catalyst pellets having a bulk density of from 1.75 to 3.25 grams per cubic centimeter, in combination the steps comprising:
(a) combining intimately in a substantially dry densification a cobalt oxide having an average particle size of less than 100 microns with from 1 to 5 percent by weight, based upon the weight of said oxide, of graphite of such particle size that at least about 90 percent of said graphite passes through a 325 mesh screen;
(b) pelleting the intimately combined cobalt oxide and graphite to provide pellets having a bulk density of 1.25 to 2.00 grams per cubic centimeter; and
(c) sintering said pellets at a temperature between 500° C. and 1100° C. for a period up to 8 hours whereby sintered cobalt oxide catalyst pellets having a bulk density of 1.75 to 3.25 grams per cubic centimeter are obtained.

6. The process of claim 1 wherein said average particle size is less than 40 microns.

7. The process of claim 5 wherein said average particle size is less than 40 microns.

References Cited

UNITED STATES PATENTS

| | | | |
|---|---|---|---|
| 2,197,707 | 4/1940 | Crittenden | 252—447 X |
| 2,481,824 | 9/1949 | Claussen et al. | 252—447 X |
| 2,570,882 | 10/1951 | Stiles | 252—472 X |
| 3,011,960 | 12/1961 | Williams et al. | 23—209.1 X |

DANIEL E. WYMAN, *Primary Examiner.*

OSCAR R. VERTIZ, *Examiner.*

A. GREIF, L. G. XIARHOS, *Assistant Examiners.*